United States Patent
Wilson

(10) Patent No.: US 10,266,120 B2
(45) Date of Patent: Apr. 23, 2019

(54) TUNED MASS DAMPERS IN MIRROR BASE

(71) Applicant: SMR Patents S.à.r.l., Luxembourg (LU)

(72) Inventor: Douglas Wilson, Burtchville, MI (US)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 15/442,143

(22) Filed: Feb. 24, 2017

(65) Prior Publication Data

US 2018/0244205 A1 Aug. 30, 2018

(51) Int. Cl.
| B60R 1/02 | (2006.01) |
| B60R 1/12 | (2006.01) |
| B60R 1/06 | (2006.01) |
| F16F 7/104 | (2006.01) |

(52) U.S. Cl.
CPC .............. B60R 1/12 (2013.01); B60R 1/06 (2013.01); F16F 7/104 (2013.01)

(58) Field of Classification Search
CPC ........................................ A47G 1/24
See application file for complete search history.

(56) References Cited

U.S. PATENT DOCUMENTS

| 3,347,513 | A | | 10/1967 | Liedel |
| 4,538,697 | A | * | 9/1985 | Muroi ............ B60K 11/04 |
| | | | | 180/300 |
| 4,804,257 | A | | 2/1989 | Schmidt |
| 4,998,814 | A | | 3/1991 | Perry |
| 5,143,342 | A | | 9/1992 | Schmidt |
| 6,036,160 | A | * | 3/2000 | Shimokobe ............ B62J 29/00 |
| | | | | 248/483 |
| 7,734,384 | B2 | * | 6/2010 | Konopa ............... B60G 13/16 |
| | | | | 429/96 |
| 8,998,185 | B2 | * | 4/2015 | Allaire .................. F16F 7/104 |
| | | | | 188/322.5 |
| 2005/0213229 | A1 | | 9/2005 | Cofer, Jr. et al. |
| 2009/0073589 | A1 | | 3/2009 | Mendoza |
| 2011/0292530 | A1 | | 12/2011 | Herrmann et al. |

FOREIGN PATENT DOCUMENTS

| DE | 4200744 | 7/1993 |
| DE | 19701480 | 7/1998 |
| DE | 19803459 | 9/1999 |
| DE | 10138478 | 2/2003 |
| DE | 10143976 | 4/2003 |
| DE | 102005055849 | 5/2007 |
| DE | 102014116799 | 3/2016 |
| EP | 0794087 | 9/1997 |
| FR | 2906201 | 3/2008 |
| WO | WO2009103117 | 8/2009 |

* cited by examiner

*Primary Examiner* — Amy J. Sterling
(74) *Attorney, Agent, or Firm* — Jones Day

(57) ABSTRACT

A motor vehicle includes mating features in a sheet metal of the motor vehicle, an exterior rear view mirror assembly fixedly secured to the motor vehicle, where the exterior rear view mirror assembly includes a structural base frame that mates to the mating features of the sheet metal at a mounting plane, and a tuned mass damper secured to the structural base frame adjacent to the mounting plane. In an example, a primary axis of movement of the tuned mass damper is at least one of substantially parallel with or substantially perpendicular to the mounting plane. In another example, the tuned mass damper is configured to dampen resonant vibrations being generated by the motor vehicle.

20 Claims, 4 Drawing Sheets

A-A

TUNED MASS DAMPERS IN MIRROR BASE

BACKGROUND OF THE INVENTION

1. Field of the Invention

The following description relates to the art of vehicle rear view mirrors and, for example, to mirrors that include tuned mass dampening systems.

2. Related Art

Functional performance of a product is essential to customer satisfaction. With respect to exterior rearview mirrors attached to automobiles, one of the most significant factors of customer satisfaction is the stability of the image that the driver sees in the mirror as he is checking for objects in his mirror. This is known as "On Road Vibration Performance" of the mirror (hereinafter "ORVP"). It is well known that all items have a frequency with which they resonate. With exterior mirrors it is common knowledge that the higher the resonant frequency of the mirror, the better the ORVP. It is also common knowledge that the resonant frequency of a mirror is usually different in the vertical axis compared to the fore/aft axis and the in/out axis.

With larger exterior mirrors such as those used on pickup trucks, the mass of the mirror is greater and the center of gravity is further outboard. It is also well known that as the mass of an object increases, the resonant frequency decreases. This makes it more difficult to achieve acceptable ORVP on these larger exterior mirrors.

Another challenge associated with achieving good ORVP with these larger truck mirrors is the fact that the vehicle itself generates a wide range of resonant vibrations from items such as the engine, tire treads contacting the road surface, stiff high load suspensions, vibrations of the hood or floor-pan, or other larger sheet metal bodies. These resonant vibrations migrate to the mirror mounting structure of the vehicle door. These resonant vibrations that present themselves in the mirror mounting structure have a variety of frequencies and amplitudes which all feed into the mirror structure and ultimately to the mirror reflective surface. These vibration inputs from the vehicle then combine with the oscillations of the mirror that are present due to inherent structural characteristics of the exterior mirror itself and can result in poorer ORVP than desired.

Mass dampening is known and mass dampers are commercially available. A typical mass damper includes a structurally rigid mounting plate, a block of material which constitutes the mass, and one or more flexible members that connect the mass with the mounting structure. A mass damper can be designed to specifically have the same resonant frequency regardless of which direction it is checked, while other mass dampers are designed to be more flexible in certain directions and less flexible in other directions resulting in different resonant frequencies in each axis. Previous applications of mass damping in an exterior mirror involved mounting a mass damper close to the connection point of the reflective mirror glass and/or the structural member of the case. The results of mass dampening at these points were not favorable as the added mass of the mass damper would increase the overall mass of the mirror, and also move the mirror's center of gravity outboard and in doing so, decrease the base resonant frequency of the mirror head.

SUMMARY

In an aspect, a motor vehicle includes mating features in a sheet metal of the motor vehicle, and an exterior rear view mirror assembly fixedly secured to the motor vehicle, the exterior rear view mirror assembly including a structural base frame that mates to the mating features of the sheet metal at a mounting plane, and a tuned mass damper secured to the structural base frame adjacent to the mounting plane, wherein a primary axis of movement of the tuned mass damper is at least one of substantially parallel with or substantially perpendicular to the mounting plane.

The tuned mass damper may be configured to dampen resonant vibrations being generated by the motor vehicle.

The tuned mass damper may be positioned between 2 millimeters to 10 millimeters away from the mounting plane.

The tuned mass damper may be positioned inboard or on a side of a motor vehicle door that is closer to the exterior rear view mirror assembly.

The tuned mass damper may include a solid block or mass, a mounting shaft that is secured to the structural base frame and extends through the solid block or mass, and at least one spring.

The at least one spring may include a first spring and a second spring, and the solid block or mass is flanked by the first spring on a side and the second spring on another side.

The tuned mass damper includes a solid block or mass, a first attaching element and a second attaching element, and at least one shaft formed of flexible material.

The at least one shaft may be formed of flexible material including a first shaft and a second shaft, and the solid block or mass may be flanked by the first shaft on a side and the second shaft on another side.

The primary axis of movement of the tuned mass damper may be substantially parallel with the mounting plane.

The primary axis of movement of the tuned mass damper may be substantially perpendicular to the mounting plane.

In another aspect, a motor vehicle includes mating features in a sheet metal of the motor vehicle, and an exterior rear view mirror assembly fixedly secured to the motor vehicle, the exterior rear view mirror assembly including a structural base frame that mates to the mating features of the sheet metal at a mounting plane; and a tuned mass damper secured to the structural base frame adjacent to the mounting plane, where the tuned mass damper is configured to dampen resonant vibrations being generated by the motor vehicle.

DESCRIPTION OF THE SEVERAL VIEWS OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

DETAILED DESCRIPTION OF THE INVENTION

Figure 1:
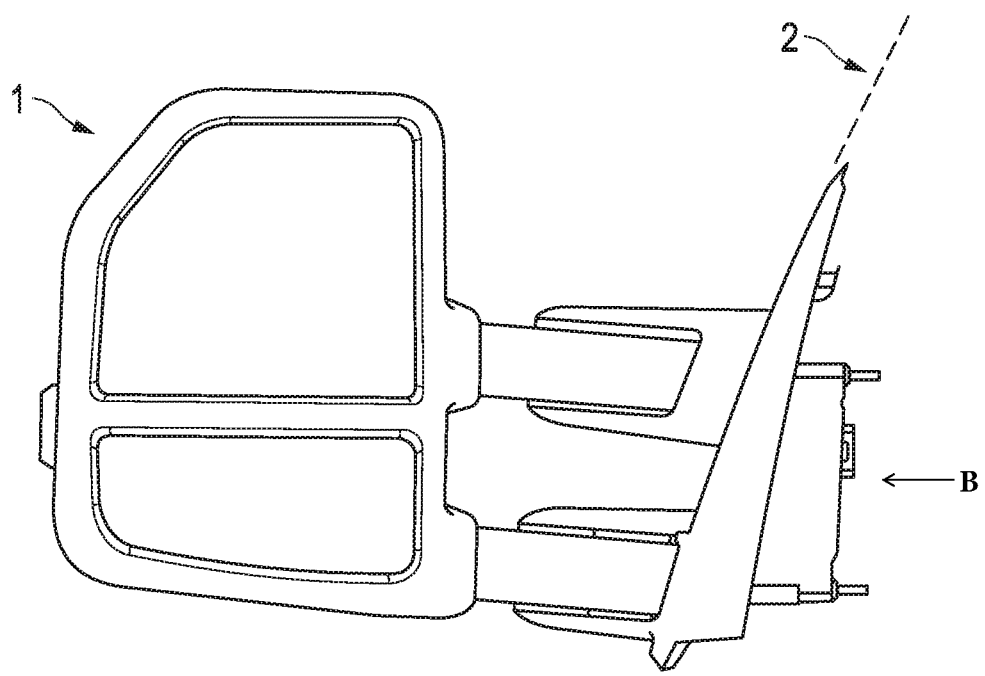
FIG. 1 is a diagram illustrating a typical pickup truck mirror and a viewing side B.

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," "corner," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

FIG. 1 is a diagram illustrating a typical pickup truck mirror with viewing side B.

Referring to FIG. 1, a mirror 1 is attached to a vehicle 2, and is attached at a mirror mounting plane of the vehicle door 2. The mirror includes a mirror base assembly which includes a base frame and a base cover. The mirror 1 also includes a mirror case assembly which, among other things, includes a mirror case and a case frame, a mirror glass actuator that suspends the backing plate assembly. The backing plate assembly includes a backing plate and a mirror reflecting element. The embodiment shown includes a secondary reflective element but this is not critical to this invention and thus may, or may not be present. In the examples described below and illustrated in FIGS. 3 and 4, a tuned mass damper assembly 14, 15 is shown secured to the base frame at a position adjacent to a mirror mounting plane.

Figure 2:
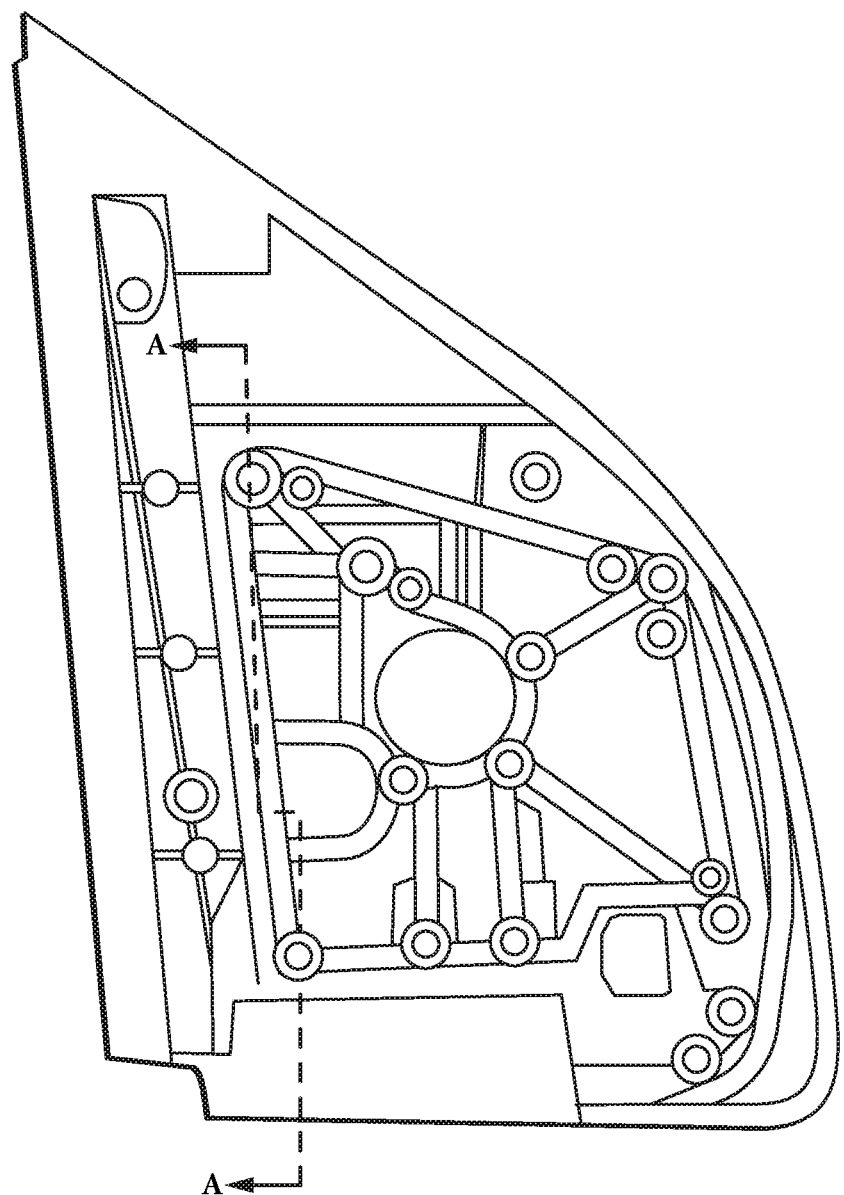
FIG. 2 is a diagram illustrating the typical mirror as viewed from an outward position and towards viewing side B illustrated in FIG. 1, and including the axis A-A.

FIG. 2 is a diagram illustrating the typical mirror as viewed from an outward position and towards viewing side B illustrated in FIG. 1, and including the axis A-A. Referring to FIG. 2, the typical mirror does not include a mass damper assembly at the base frame or mirror mounting plane. Typically, a mass damper assembly is mounted close to the connection point of the reflective mirror glass and/or the structural member of the case.

Figure 3:
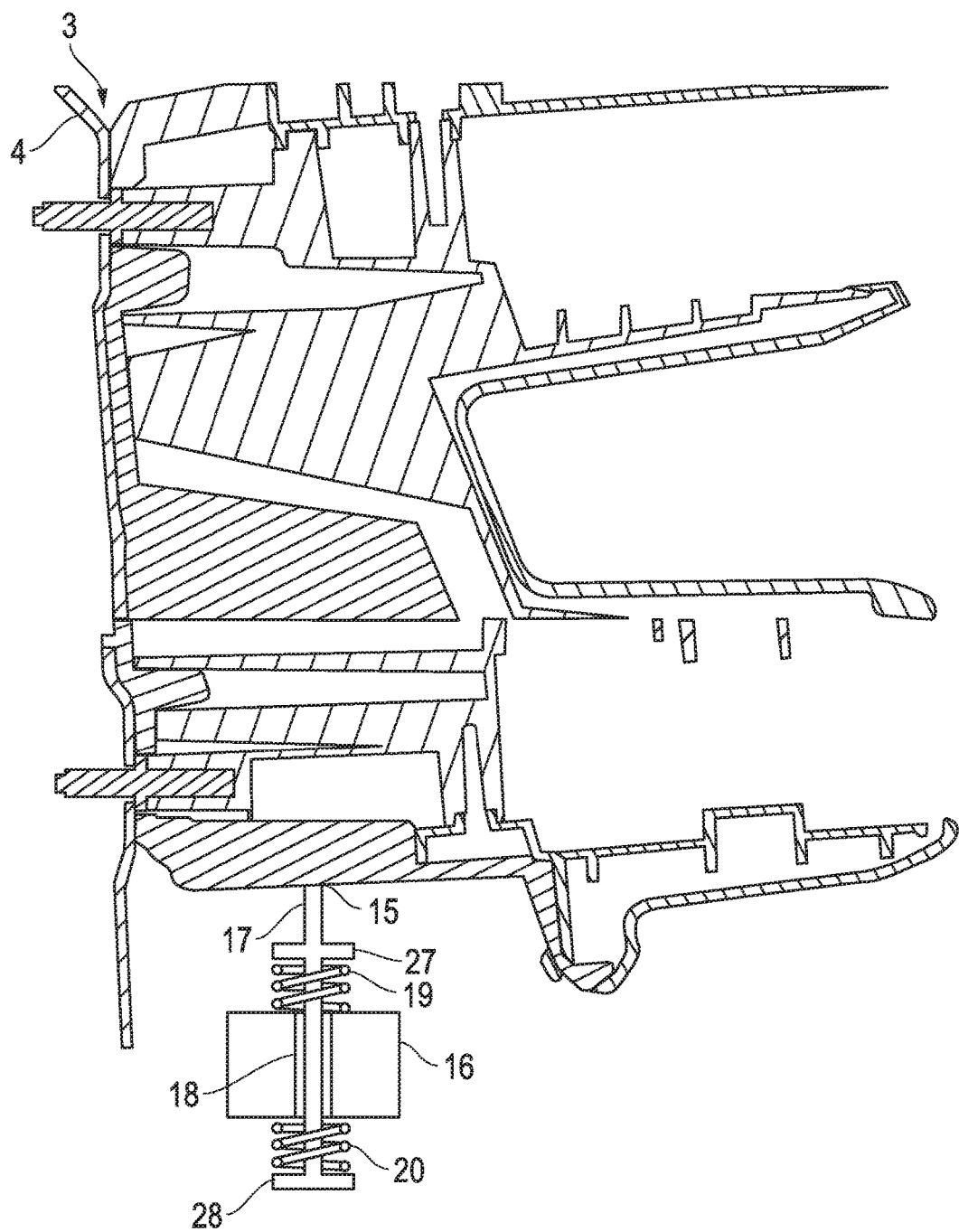
FIG. 3 is a diagram illustrating a cross-section of a mirror along the axis A-A illustrated in FIG. 2 and including a first embodiment of a mass dampening system.

FIG. 3 is a diagram illustrating a cross-section of a mirror along the axis A-A illustrated in FIG. 2 and including a first embodiment of a mass dampening system.

Referring to FIG. 3, one embodiment of a tuned mass damper assembly 14 is illustrated, in which the mass 16 includes a solid block of heavy material, such as steel, aluminum, lead or some other similar material. Also included is the mounting shaft 17 which is secured to the base frame at position 15 on one end. The other end of the mounting shaft 17 extends through a hole 18 in the center of the mass 16. The mass 16 is held in position by springs 19 and 20. Spring 19 has one end abutting a flange 27 on the upper end of mounting shaft 17 while the other end abuts the upper side of mass 16. Likewise, spring 20 has one end abutting with a flange 28 on the lower end of the mounting shaft 17 while the other end of spring 20 abuts with the lower side of mass 16. In this manner, the mass 16 is allowed to move along the axis of the mounting shaft 17 when the force applied is greater that the resultant forces of the springs 19 and 20 that hold the mass 16 in position.

Figure 4:
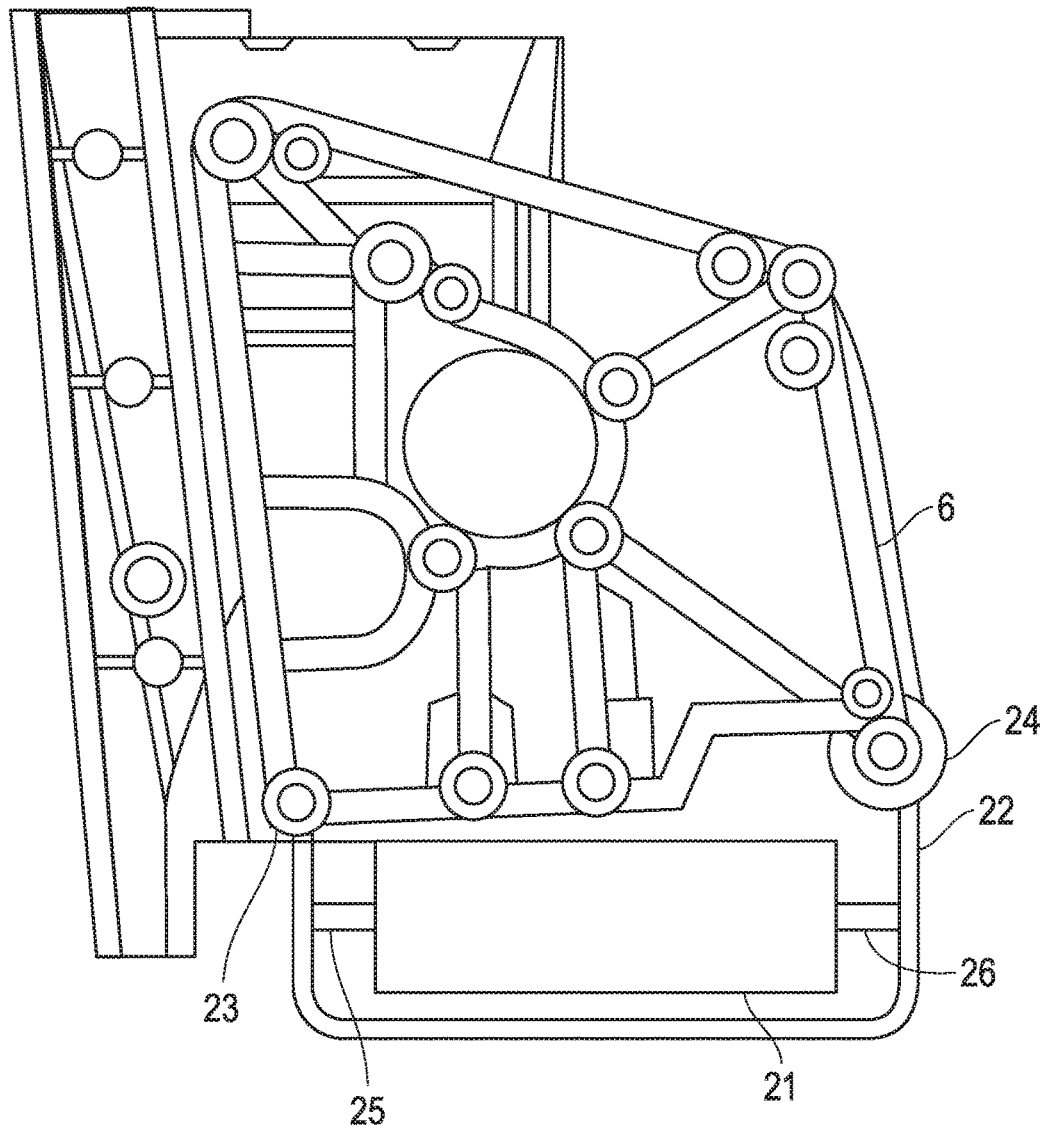
FIG. 4 is a diagram illustrating a magnified view of a mirror as viewed from an outward position and towards viewing side B illustrated in FIG. 1, and including a second embodiment of a mass dampening system.

FIG. 4 is a diagram illustrating a magnified view of a mirror as viewed from an outward position and towards viewing side B illustrated in FIG. 1, and including a second embodiment of a mass dampening system.

Referring to FIG. 4, another embodiment of a tuned mass damper assembly is illustrated, in which the mass 21 includes a solid block of heavy material, such as steel, aluminum, lead or some other similar material. Also included is a mounting plate 22 which is secured to the base frame 6 at a first position 23 and a second position 24. Mass 21 is secured to mounting plate 22 using two flexible members 25 and 26. Mass dampening is achieved in this embodiment because flexible members 25 and 26 allow the mass 21 to resonate in response to vibration inputs transmitted through the vehicle.

In an aspect of the above described embodiments and descriptions, a tuned mass damper 16, 21 is secured to the mirror base adjacent to the mirror mounting plane 3. If packaging space permits, this can be mounted into the structure of the base frame proper. The mass damper 16, 21 may be designed to have a greater degree of flexibility in the axis that has the greatest amount of resonant vibration, or energy input as produced by the vehicle. In this sense, as described, the mass damper is considered "tuned". With the mass damper located as close as possible to the mounting plane 3 of the exterior mirror, it does not increase the amount of suspended mass at the outboard end of the mirror. This moves the relative mirror center of gravity inboard and thus does not decrease the resonant frequency of the mirror. By being located inboard of and adjacent to the mirror mounting plane 3 of the door, the mass damper has the effect of smoothing out the resonant vibrations that are produced by the vehicle that would otherwise be input directly to the mirror. By smoothing out the vibration inputs into the mirror, the ORVP of the mirror is significantly improved.

In an aspect, adjacent to the mirror mounting plane 3 is preferably within a range of about 2 to about 10 millimeters from the mirror mounting plane 3; however, this range is not limited thereto. For example, the range includes at least 2 millimeters, at least 3 millimeters, at least 4 millimeters, at least 5 millimeters, at least 6 millimeters, at least 7 millimeters, at least 8 millimeters, at least 9 millimeters, at least 10 millimeters, at most 2 millimeters, at most 3 millimeters, at most 4 millimeters, at most 5 millimeters, at most 6 millimeters, at most 7 millimeters, at most 8 millimeters, at most 9 millimeters, and at most 10 millimeters from the mirror mounting plane. In a further example, a range from about 0 to about 50 millimeters from the mounting plane 3 is also described.

The apparatus of the present invention has been described above and in the attached drawings; however, modifications will be apparent to those of ordinary skill in the art and the scope of protection for the invention is to be defined by the claims that follow.

The invention claimed is:

1. A motor vehicle, comprising:
    mating features in a sheet metal of the motor vehicle; and
    an exterior rear view mirror assembly fixedly secured to the motor vehicle, the exterior rear view mirror assembly comprising
        a structural base frame that mates to the mating features of the sheet metal at a mounting plane; and
        a tuned mass damper secured to the structural base frame adjacent to the mounting plane,
    wherein a primary axis of movement of the tuned mass damper is at least one of substantially parallel with or substantially perpendicular to the mounting plane.

2. The motor vehicle of claim 1, wherein the tuned mass damper is configured to dampen resonant vibrations being generated by the motor vehicle.

3. The motor vehicle of claim 1, wherein the tuned mass damper is positioned between 2 millimeters to 10 millimeters away from the mounting plane.

4. The motor vehicle of claim 1, wherein the tuned mass damper is positioned inboard or on a side of a motor vehicle door that is closer to the exterior rear view mirror assembly.

5. The motor vehicle of claim 1, wherein the tuned mass damper comprises
    a solid block or mass;
    a mounting shaft that is secured to the structural base frame and extends through the solid block or mass; and
    at least one spring.

6. The motor vehicle of claim 5, wherein the at least one spring comprises a first spring and a second spring, and the solid block or mass is flanked by the first spring on a side and the second spring on another side.

7. The motor vehicle of claim 1, wherein the tuned mass damper comprises
    a solid block or mass;
    a first attaching element and a second attaching element; and
    at least one shaft formed of flexible material.

8. The motor vehicle of claim 7, wherein the at least one shaft formed of flexible material comprises a first shaft and a second shaft, and the solid block or mass is flanked by the first shaft on a side and the second shaft on another side.

9. The motor vehicle of claim 1, wherein the primary axis of movement of the tuned mass damper is substantially parallel with the mounting plane.

10. The motor vehicle of claim 1, wherein the primary axis of movement of the tuned mass damper is substantially perpendicular to the mounting plane.

11. A motor vehicle, comprising:
    mating features in a sheet metal of the motor vehicle; and
    an exterior rear view mirror assembly fixedly secured to the motor vehicle, the exterior rear view mirror assembly comprising
        a structural base frame that mates to the mating features of the sheet metal at a mounting plane; and
        a tuned mass damper secured to the structural base frame adjacent to the mounting plane,
    wherein the tuned mass damper is configured to dampen resonant vibrations being generated by the motor vehicle.

12. The motor vehicle of claim 11, wherein the tuned mass damper is positioned between 2 millimeters to 10 millimeters away from the mounting plane.

13. The motor vehicle of claim 12, wherein the tuned mass damper is positioned inboard or on a side of a motor vehicle door that is closer to the exterior rear view mirror assembly.

14. The motor vehicle of claim 12, wherein the tuned mass damper comprises
    a solid block or mass;
    a mounting shaft that is secured to the structural base frame and extends through the solid block or mass; and
    at least one spring.

15. The motor vehicle of claim 14, wherein the at least one spring comprises a first spring and a second spring, and the solid block or mass is flanked by the first spring on a side and the second spring on another side.

16. The motor vehicle of claim 12, wherein the tuned mass damper comprises
    a solid block or mass;
    a first attaching element and a second attaching element; and
    at least one shaft formed of flexible material.

17. The motor vehicle of claim 16, wherein the at least one shaft formed of flexible material comprises a first shaft and a second shaft, and the solid block or mass is flanked by the first shaft on a side and the second shaft on another side.

18. The motor vehicle of claim 12, wherein a primary axis of movement of the tuned mass damper is at least one of substantially parallel with or substantially perpendicular to the mounting plane.

19. The motor vehicle of claim 18, wherein the primary axis of movement of the tuned mass damper is substantially parallel with the mounting plane.

20. The motor vehicle of claim 18, wherein the primary axis of movement of the tuned mass damper is substantially perpendicular to the mounting plane.

* * * * *